United States Patent
Dalton et al.

[19]

[11] Patent Number: 5,900,143
[45] Date of Patent: May 4, 1999

[54] PORTABLE CONTAINER FOR PURIFYING DRINKING WATER

[75] Inventors: Keith Raymond Dalton, Maidstone; Roger John Cheeseman, Tonbridge; Charles Sidney Dalton, Regis, all of United Kingdom

[73] Assignee: Michael Bedford Brotchie, London, United Kingdom

[21] Appl. No.: 08/843,473

[22] Filed: Apr. 16, 1997

[51] Int. Cl.[6] .................................................. C02F 1/78
[52] U.S. Cl. .................. 210/192; 210/206; 210/221.2; 210/244; 210/282; 210/416.3; 210/470
[58] Field of Search .................................... 210/192, 205, 210/206, 221.2, 244, 248, 416.3, 464, 465, 470, 282

[56] References Cited

U.S. PATENT DOCUMENTS

| | | | |
|---|---|---|---|
| 3,382,980 | 5/1968 | Silva | 210/123 |
| 3,445,001 | 5/1969 | La Raus | 210/98 |
| 3,692,180 | 9/1972 | LaRaus | 210/192 |
| 3,726,404 | 4/1973 | Troglione | 210/139 |
| 3,756,413 | 9/1973 | Gartner | 210/205 |
| 3,843,521 | 10/1974 | Zeff | 210/138 |
| 4,019,986 | 4/1977 | Burris et al. | 210/192 |
| 4,090,960 | 5/1978 | Cooper | 210/192 |
| 5,087,374 | 2/1992 | Ding | 210/673 |
| 5,190,648 | 3/1993 | Ramsauer | 210/172 |
| 5,266,215 | 11/1993 | Engelhard | 210/748 |

*Primary Examiner*—Peter A. Hruskoci
*Attorney, Agent, or Firm*—Iandiorio & Teska

[57] ABSTRACT

A portable container (2) for purifying drinking water (4), which container (2) comprises a body portion (6) for containing the drinking water (4), a handle (8) for lifting the container (2) for water pouring and water re-filling purposes, an ozone generator (10) for generating ozone from air, an air pump (12) for delivering air to the ozone generator (10) in order to produce a mixture of air and ozone and for delivering the mixture of air and ozone to the drinking water (4) in the body portion (6), and a filter (14) for the drinking water (4), and the container (2) being such that the mixture of air and ozone delivered to the drinking water (4) in the body portion (6) causes the drinking water (4) and the mixture of air and ozone continuously to pass through the filter (14) whereby the filter (14) filters the drinking water (4), and the ozone purifies both the water and the filter means (14).

6 Claims, 3 Drawing Sheets

PORTABLE CONTAINER FOR PURIFYING DRINKING WATER

This invention relates to a portable container for purifying drinking water.

Drinking water is often not as pure as people would like it to be. Some people ignore the problem and drink water direct from taps. In countries where the water from the taps is not sufficiently pure, the people may suffer stomach upsets. Other people refuse to drink water from taps and they drink only bottled water. The bottled water is expensive to purchase and heavy to carry, especially when large quantities of it are required.

It is an aim of the present invention to reduce the above mentioned problems.

Accordingly, in one non-limiting embodiment of the present invention there is provided a portable container for purifying drinking water, which container comprises a body portion for containing the drinking water, a handle for lifting the container for water pouring and water re-filling purposes, ozone generating means for generating ozone from air, an air pump for delivering air to the ozone generating means in order to produce a mixture of air and ozone and for delivering the mixture of air and ozone to the drinking water in the body portion, conduit means for conveying the mixture of air and ozone to a bottom part of the body portion, and an up-lift tube up which the mixture of air and ozone passes after it leaves the conduit means, the up-lift tube terminating in the filter means such that the mixture of air and ozone in the up-lift tube passes directly into the filter means, and filter means for the drinking water, and the container being such that the mixture of air and ozone delivered to the drinking water in the body portion causes the drinking water and the mixture of air and ozone continuously to pass through the filter means whereby the filter means filters the drinking water, and the ozone purifies both the water and the filter means.

The portable container of the present invention is thus easily able to be filled with water from a tap or another suitable source, and then the water in the container can be purified in the container. The generation of the ozone firstly advantageously helps to kill bacteria in the water, and secondly advantageously helps to kill bacteria in the filter means which is filtering the water, whereby the filter means tends to stay fresh and effective for considerably longer periods of time than would be the case if the filter means were not being treated with the ozone.

Preferably, the conduit means is positioned in the up-lift tube. The filter means may be located by the up-lift tube in a top part of the body portion.

The conduit means preferably terminates in an air stone. The air stone causes the formation of bubbles which increases the surface area of the water treated by the mixture of air and ozone.

Preferably, the container is in the form of a jug. Generally, the container may be in any suitable and appropriate shape so that, for example, the container may be in the shape of a kettle.

Usually, the container will include a lid for the body portion.

The ozone generating means may comprise a gas filled discharge device forming a dielectric, an anode extending outwardly of the discharge device from inside the discharge device, a cathode positioned around the outside of the discharge device, capacitor discharge means for feeding a needle pulsed voltage to the anode, and connector means connecting the ozone generating means to one end of an air line, the other end of the air line being connected to the air pump, and the ozone generating means being such that air in the air line enters the ozone generating means and, when a high voltage is applied to the anode, ozone is generated at the cathode to produce the mixture of air and ozone.

The discharge device is preferably a discharge tube. Other types of discharge device may however be employed.

The discharge device will usually be filled with neon so that the gas filled discharge device will then be a neon filled discharge device. Other inert gases may however be employed in the discharge device.

The cathode may be a wire which is wound around the outside of the discharge device. The cathode may be of other constructions if desired.

The ozone generating means may include a high tension electrical generator for feeding mains voltage to the discharge device.

An embodiment of the invention will now be described solely by way of example and with reference to the accompanying drawings in which.

Figure 1:
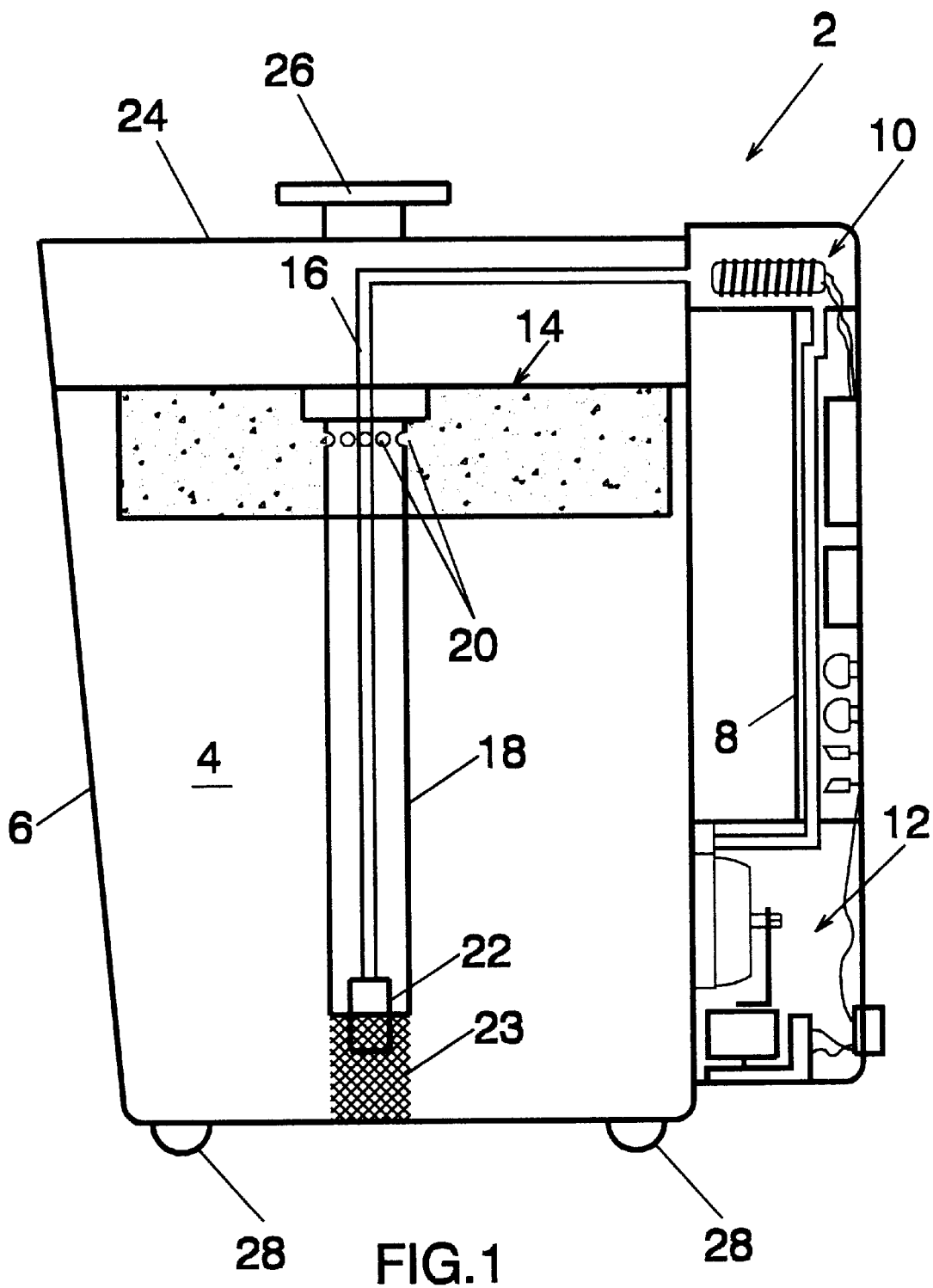
FIG. 1 is a section through a portable container for purifying drinking water.

Referring to FIG. 1, there is shown a portable container 2 for purifying drinking water 4. The container 2 comprises a body portion 6 for containing the drinking water 4, and a handle 8 for lifting the container 2 for water pouring and water re-filling purposes.

The container 2 also comprises ozone generating means 10 for generating ozone from air. An air pump 12 circulates air to the ozone generating means 10 in order to produce a mixture of air and ozone. The container 2 has filter means 14 for the drinking water 4.

The container 2 has conduit means 16 in the form of a pipe. The conduit means 16 is for conveying the mixture of air and ozone to a bottom part of the body portion 6. More specifically, the conduit means 16 is positioned in an up-lift tube 18. The conduit means 16 terminates at its lower end in an air stone 22. The air stone 22 causes the formation of bubbles when the air pump 12 delivers the mixture of air and ozone to the air stone 22 via the conduit means 16. The bubbles increase the surface area of the water subjected to the mixture of air and ozone. The water enters the up-lift tube 18 through apertures 23.

The up-lift tube 18 terminates in the filter means 14 as shown. Thus the mixture of air and ozone in the water in the up-lift tube 18 passes directly into the filter means 14. The filter means 14 is located on the top of the up-lift tube 18 in a top part of the body portion 6 of the container 2 as shown in FIG. 1. Apertures 20 in the up-lift tube 18 help to allow the even distribution of the drinking water, air and ozone from the up-lift tube 18. The up-lift tube 18 acts as a reaction chamber where the water is treated with the mixture of air and ozone.

As shown in FIG. 1, the container 2 is in the form of a jug. The container 2 has a lid 24. The lid 24 has a handle 26 for enabling the lid 24 to be removed from and fitted on the body portion 6. The body portion 6 has feet 28.

The container 2 is such that the drinking water 4 and the mixture of air and ozone continuously pass through the filter means 14. The filter means 14 is thus able to filter the drinking water 4. The ozone in the mixture of air and ozone is thus able to purify both the water and the filter means 14. This in turn enables the filter means 14 to operate at maximum efficiency for extended periods of time because the filter means 14 is less likely to clog up with dirt/bacteria than would be the case if the filter means 14 were not continuously treated with ozone.

Figure 2:
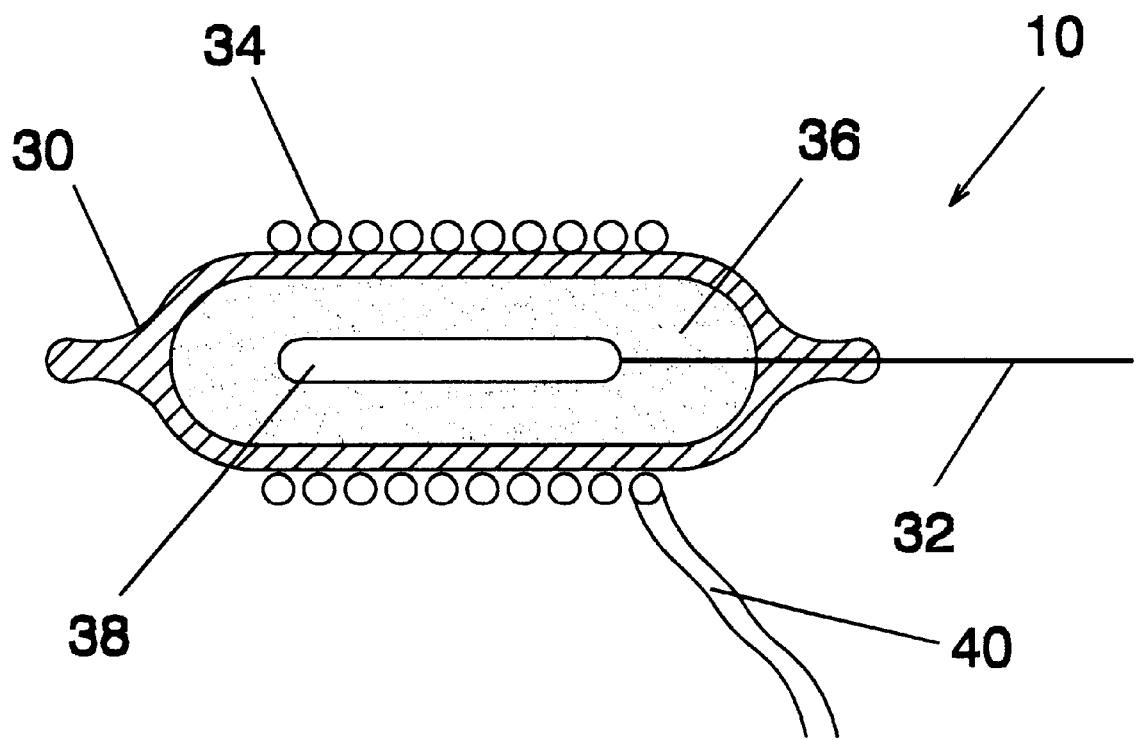
FIG. 2 shows part of ozone generating means used in the portable container shown in FIG. 1.

The ozone generating means 10 is shown in more detail in FIG. 2. It will be seen that the ozone generating means 10 comprises a gas filled discharge device 30 forming a dielectric. An anode 32 is sealed into and extends from the discharge device 30. A cathode in the form of a wire 34 is wound around the outside of the discharge device 30. The discharge device 30 is in the form of a tube which is filled with neon gas 36. The anode 32 has a part 38 which is provided inside the discharge device 30 and which is surrounded by the neon gas 36. A cathode connection 40 is attached to the wire 34 as shown.

Figure 3:
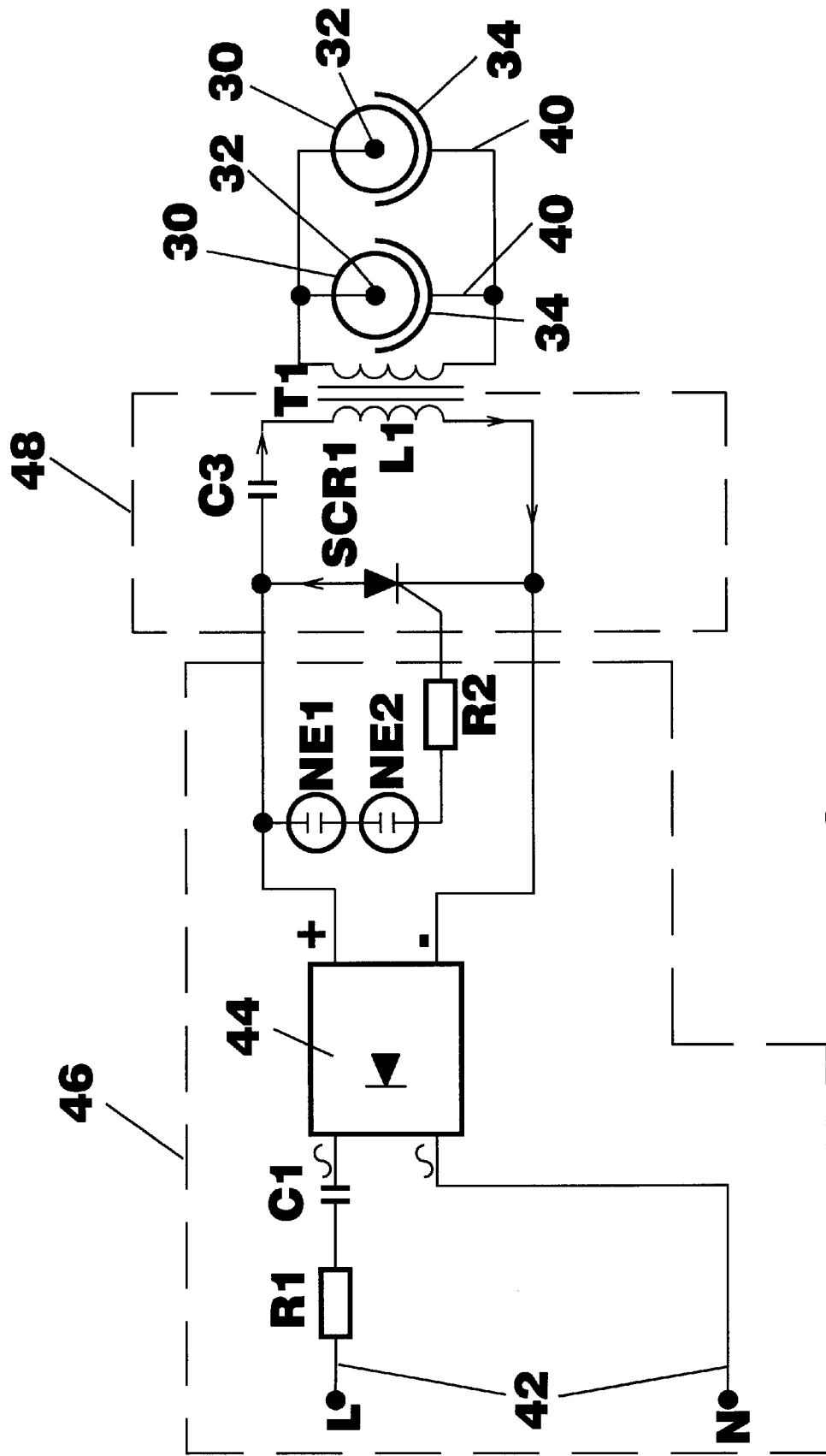
FIG. 3 shows the electrical circuit of the ozone generating means shown in FIG. 2.

The circuit for the ozone generating means 10 is shown in FIG. 3. In FIG. 3, there is shown a mains supply 42 which is connected to a rectifier 44 via a resistance R1 and a capacitor C1. The rectifier 44 is connected to two neon lamps NE1 and NE2. The neon lamps NE1 and NE2 are connected in series with a resistance R2. This apparatus as so far described forms a power supply circuit 46. In the power supply circuit 46, the capacitor C1 acts as a resistor to limit the current through the power supply circuit 46. The rectifier 44 is a diode bridge rectifier.

The resistance R2 is connected to a silicon controlled rectifier SCR1 as shown. The silicon controlled rectifier SCR1 is itself connected to a capacitor C3 and the primary winding L1 of a transformer T1. The silicon controlled rectifier SCR1, the capacitor C3 and the primary winding L1 of the transformer T1 form a capacitor discharge circuit 48. The neon lamps NE1 and NE2 form a trigger device which is able to trigger the silicone controlled rectifier SCR1 as will be seen from FIG. 3.

The transformer T1 is connected as shown to two of the discharge devices 30. If desired, only one of the discharge devices 30 need be employed.

Where possible, the electrical circuit components are sealed in an epoxy compound. Thus, in the event that the container 2 should become wet, for example during cleaning, then the various sealed parts will not be damaged by the water.

The capacitor discharge circuit 48 forms capacitor discharge means feeding a needle pulsed voltage to the anode 32 of each of the discharge devices 30. More specifically, during operation of the container 2, a mains A.C. supply voltage is supplied via the resistance R1 and the capacitor C1 to the bridge rectifier 44. The power supply is powered from a full wave unsmoothed d.c. voltage to the silicon controlled rectifier SCR1 pulse firing circuit which includes the two neon lamps NE1 and NE2 feeding a negative d.c. supply via the resistance R2. The resistance R2 is calculated so as to limit the average forward current of the silicon controlled rectifier SCR1, which should be kept below the cut-off current of the silicon controlled rectifier SCR1. The circuit runs at a pulse repetition frequency of 100 Hz, producing two 20 micro-second needle pulses every 10 milliseconds.

As the full wave d.c. voltage rises from zero potential through to trigger voltage (VT1), 180 volts approximately, a current (Ic) will charge capacitor C3 to Vc. This is represented as follows:

Vc=VT1/2-Vg

V g=1.2 volts

VT1/2=180 volts

When the trigger voltage is reached, the two neon lamps NE1 and NE2 will conduct, causing a gate current to be injected into the silicon controlled rectifier SCR1. The silicon controlled rectifier SCR1 will consequently conduct, causing a rapid discharge of the storage charge on the capacitor C3.

Both rapid charge and discharge of the capacitor C3 cause a large current pulse in the primary L1 of the transformer T1. The transformer T1 is a pulse transformer which therefore steps up the pulses to the required 4KV PK-PK.

EXAMPLE

VO=VcxN N=NS=250=25

VO=(180-1.2) 25

Vc=4440 volts (RZ) are the circuit losses which will consist of, the SCR 'ON' resistance and the copper losses of (L1)

These are neglible and consequently quite large currents will flow (25 amps or more). Therefore, the discharge circuit path should be kept to a minimum.

$$Fr = \frac{1}{2Pi\sqrt{LC}} = 33.931 \text{KHZ} \quad \begin{array}{l} L = 100 \\ C = 0.22 \end{array}$$

XL=2PiFL=21.31 OHMS
XC=2PiFC=21.32 OHMS
Q=XL=21.32=733.8
RZ 0.02904

The resistance R1 is not a standard resistor and it is a reactance of the capacitor C1, which at mains frequency will be a value of 0.47 $\mu$F for 32 mA current.

It is to be appreciated that the embodiment of the invention described above with reference to the accompanying drawings has been given by way of example only and that modifications may be effected. Thus, for example, the discharge device 30 may be tubular and a gas other than neon may be employed. Also, a cathode other than the wire 34 may be employed. If desired, the ozone generating means 10 may include screening means for facilitating the prevention of any electrical interference. For example, the ozone generating means 10 may be provided in a box which is sprayed or coated on its inside with a metal or a plastics electrically conductive coating in order to provide the required screening. Alternatively, the screen means may be effected by a foil lining to the box, for example made of aluminium.

In order to prevent electrical pulse interference leaking from the ozone generating means 10 along a power line, for example from a box in which the component parts of the ozone generating means 10 are housed, there may be provided an electrical filter in the power line with a capacitor to ground. Other methods of filtering noise from the power line may be employed.

The air pump 12 is mounted as shown in FIG. 1. The circuit components shown in FIG. 3 are shown somewhat schematically as electrical components in the handle 8 of the container 2 in FIG. 1.

We claim:

1. A portable container for purifying drinking water, which container comprises a body portion for containing the drinking water, a handle for lifting the container for water pouring and water-refilling purposes, ozone generating means for generating ozone from air, an air pump for delivering air to the ozone generating means in order to produce a mixture of air and ozone and for delivering the mixture of air and ozone to the drinking water in the body portion, filter means for the drinking water, conduit means for conveying the mixture of air and ozone to a bottom part of the body portion, and an up-lift tube up which the mixture and air and ozone passes after it leaves the conduit means, the up-lift tube terminating in the filter means such that the mixture of air and ozone in the up-lift tube passes directly into the filter means, and the container being such that the mixture of air and ozone delivered to the drinking water in the body portion causes the drinking water and the mixture of air and ozone continuously to pass through the filter means whereby the filter means filters the drinking water, and the ozone purifies both the water and the filter means.

2. A portable container according to claim 1 in which the conduit means is positioned in the up-lift tube.

3. A portable container according to claim 1 in which the filter means is located by the up-lift tube in a top part of the body portion.

4. A portable container according to claim 1 in which the conduit means terminates in an air stone.

5. A portable container according to claim 1 and which is in the form of a jug.

6. A portable container according to claim 1 and including a lid for the body portion.

* * * * *